United States Patent
Bastide et al.

(10) Patent No.: US 10,581,745 B2
(45) Date of Patent: Mar. 3, 2020

(54) DYNAMIC THROTTLING THRESHOLDS

(71) Applicant: International Business Machines Corporation, Armonk, NY (US)

(72) Inventors: Paul R. Bastide, Boxford, MA (US); Manish Kataria, Delhi (IN); Miguel A. Estrada, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/838,134

(22) Filed: Dec. 11, 2017

(65) Prior Publication Data
US 2019/0182168 A1    Jun. 13, 2019

(51) Int. Cl.
*H04L 12/851* (2013.01)
*H04L 29/06* (2006.01)
*H04L 29/08* (2006.01)

(52) U.S. Cl.
CPC .......... *H04L 47/24* (2013.01); *H04L 67/1002* (2013.01); *H04L 67/42* (2013.01)

(58) Field of Classification Search
CPC . H04L 47/24; H04L 63/0236; H04L 63/1408; H04L 63/1416; H04L 63/1458;
(Continued)

(56) References Cited

U.S. PATENT DOCUMENTS

| | | | |
|---|---|---|---|
| 6,789,203 B1 * | 9/2004 | Belissent | H04L 47/10 370/229 |
| 6,986,139 B1 * | 1/2006 | Kubo | G06F 9/505 709/223 |

(Continued)

FOREIGN PATENT DOCUMENTS

WO    WO2014099906 A1    6/2014

OTHER PUBLICATIONS

Ghosh et al., Priority based Modified Throttled Algorithm in Cloud Computing, Aug. 27, 2016, IEEE, 2016 International Conference on Inventive Computation Technologies (ICICT) (Year: 2016).*

(Continued)

*Primary Examiner* — Eric Nowlin
(74) *Attorney, Agent, or Firm* — Konrad Raynes Davda & Victor LLP; Janaki K. Davda

(57) ABSTRACT

Provided are techniques for providing dynamic throttling thresholds. A request from a client is received. A request count is incremented. A current dynamic throttling threshold is selected based on the request. In response to determining that the request count is less than the current dynamic throttling threshold, the request is sent to a server for processing and a response and a response time are received from the server. In response to determining one of 1) that the request count equals or exceeds a recalculation count and 2) that a time interval for recalculation has ended, a new dynamic throttling threshold is calculated using the response time and the current dynamic throttling threshold is set to the new dynamic throttling threshold. Then, the response is returned to the client. In response to determining that the request count is not less than the current dynamic throttling threshold, the request is throttled.

18 Claims, 8 Drawing Sheets

(58) Field of Classification Search
CPC ..... H04L 63/16; H04L 67/02; H04L 67/1002; H04L 67/42; H04L 2463/141
See application file for complete search history.

(56) References Cited

U.S. PATENT DOCUMENTS

| | | | | |
|---|---|---|---|---|
| 7,039,728 | B2* | 5/2006 | Tamura | G06F 13/387 710/25 |
| 7,657,618 | B1* | 2/2010 | Rothstein | H04L 69/16 709/223 |
| 7,720,990 | B2* | 5/2010 | Shen | G06F 9/466 709/217 |
| 7,849,502 | B1* | 12/2010 | Bloch | H04L 29/12066 726/11 |
| 8,046,238 | B2* | 10/2011 | Solomon | G06Q 10/0631 705/1.1 |
| 8,190,593 | B1 | 5/2012 | Dean | |
| 8,260,864 | B2* | 9/2012 | Sana | H04L 67/26 709/206 |
| 8,281,382 | B1 | 10/2012 | Sanyal et al. | |
| 8,438,639 | B2* | 5/2013 | Lee | H04L 43/16 726/22 |
| 8,493,858 | B2 | 7/2013 | Kamath et al. | |
| 8,539,080 | B1 | 9/2013 | Uluderya et al. | |
| 8,713,099 | B2* | 4/2014 | Sana | H04L 67/26 709/203 |
| 9,094,262 | B2* | 7/2015 | Hueter | H04L 67/1034 |
| 9,330,051 | B1* | 5/2016 | Martin | G06F 15/173 |
| 9,385,928 | B2* | 7/2016 | Petta | G06F 17/30864 |
| 9,411,834 | B2* | 8/2016 | Hrischuk | G06F 16/21 |
| 9,426,174 | B2* | 8/2016 | Campbell | H04L 63/1425 |
| 9,473,413 | B1 | 10/2016 | Cao et al. | |
| 9,609,052 | B2* | 3/2017 | Jalan | H04L 67/1008 |
| 9,825,871 | B2* | 11/2017 | Wang | H04L 41/5025 |
| 9,942,162 | B2* | 4/2018 | Golshan | H04L 47/125 |
| 9,961,136 | B2* | 5/2018 | Jalan | H04L 67/1008 |
| 10,019,756 | B2* | 7/2018 | Atkins | G06Q 40/00 |
| 10,178,165 | B2* | 1/2019 | Jalan | H04L 67/1008 |
| 10,326,828 | B2* | 6/2019 | Yin | H04L 29/08 |
| 2005/0076162 | A1* | 4/2005 | Tamura | G06F 13/387 710/20 |
| 2008/0086434 | A1* | 4/2008 | Chesla | G06N 5/048 706/12 |
| 2008/0168446 | A1* | 7/2008 | Shen | G06F 9/466 718/101 |
| 2009/0089419 | A1* | 4/2009 | Saha | H04L 41/0681 709/224 |
| 2009/0204666 | A1* | 8/2009 | Sana | H04L 67/26 709/203 |
| 2009/0210876 | A1* | 8/2009 | Shen | G06F 9/505 718/100 |
| 2011/0099622 | A1* | 4/2011 | Lee | H04L 43/16 726/13 |
| 2011/0107412 | A1* | 5/2011 | Lee | H04L 63/1458 726/11 |
| 2012/0084165 | A1 | 4/2012 | Hirose et al. | |
| 2012/0144015 | A1* | 6/2012 | Jalan | H04L 67/1008 709/224 |
| 2012/0331047 | A1* | 12/2012 | Sana | H04L 67/26 709/203 |
| 2013/0173809 | A1* | 7/2013 | Hueter | H04L 67/1034 709/226 |
| 2015/0163241 | A1* | 6/2015 | Campbell | H04L 63/1458 726/22 |
| 2015/0199388 | A1* | 7/2015 | Hrischuk | G06F 16/21 707/802 |
| 2015/0256553 | A1* | 9/2015 | Tripp | H04L 63/1433 726/23 |
| 2015/0263986 | A1* | 9/2015 | Park | H04L 47/781 709/226 |
| 2015/0277964 | A1* | 10/2015 | Atkins | G06Q 40/00 718/101 |
| 2015/0281104 | A1* | 10/2015 | Golshan | H04L 47/125 370/238 |
| 2016/0139952 | A1* | 5/2016 | Geng | G06F 9/4818 718/103 |
| 2016/0156567 | A1* | 6/2016 | Miyahara | H04L 12/4641 709/226 |
| 2017/0019342 | A1* | 1/2017 | Wang | H04L 41/5025 |
| 2017/0134407 | A1* | 5/2017 | Mason | H04L 63/1416 |
| 2017/0187793 | A1* | 6/2017 | Jalan | H04L 67/1008 |
| 2017/0251051 | A1* | 8/2017 | Yin | H04L 29/08 |
| 2017/0272343 | A1* | 9/2017 | Giles | H04L 43/10 |
| 2017/0285945 | A1 | 10/2017 | Kryvaltsevich | |
| 2018/0152508 | A1* | 5/2018 | Jalan | H04L 67/1008 |
| 2018/0270305 | A1* | 9/2018 | Tignor | H04L 67/1008 |
| 2018/0322569 | A1* | 11/2018 | Atkins | G06Q 40/00 |
| 2019/0098083 | A1* | 3/2019 | Jalan | H04L 67/1008 |

OTHER PUBLICATIONS

Verma et al., Automated Optimal Dispatching of Service Requests, Apr. 2, 2011, IEEE, 2011 Annual SRII Global Conference (Year: 2011).*

Maguluri et al., Scheduling Jobs with Unknown Duration in Clouds, Apr. 19, 2013, IEEE, 2013 Proceedings IEEE INFOCOM (Year: 2013).*

Omori et al., Request Distribution for Heterogeneous Database Server Clusters with Processing Time Estimation, Jul. 20, 2018, IEEE, 2018 IEEE 16th International Conference on Industrial Informatics (INDIN) (Year: 2018).*

Baer, B., "HTTP Request Monitoring and Throttling", [online], [Retrieved on Dec. 7, 2017]. Retrieved from the Internet at: URL: <https://blogs.technet.microsoft.com/wbaer/2010/04/22/http-request-monitoring-and-throttling/>, © 2017 Microsoft, Total 7 pp.

IP.com, "Dynamic API Provider Protection", Jun. 2, 2016, IPCOM000246351D, retrieved from the Internet at: URL: <http://ip.com/IPCOM/000246351>, Total 3 pp.

IP.com, "Mechanism for Measuring Response Times in Multitiered Grid Computing Systems", Oct. 19, 2011, IPCOM000211796D, retrieved from the Internet at: URL: <http://ip.com/IPCOM/000211796>, Total 4 pp.

IP.com, "Method and System for Optimal Self-adjusting API Definitions", Jul. 25, 2014, IPCOM000238004D, retrieved from the Internet at: URL: <http://ip.com/IPCOM/000238004>, Total 4 pp.

Stack Exchange, Inc., "Throttles—Stack Exchange API", [online], [Retrieved on Dec. 11, 2017]. Retrieved from the Internet at <URL: https://api.stackexchange.com/docs/throttle>, © 2017 Stack Exchange, Inc., Total 2 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computingicloud-computing-v26.ppt>, Total 80 pp.

Mell, P. and T. Grange, "The NIST Definition of Cloud Computing (Draft)", Sep. 2011, Computer Security Division Information Technology Laboratory National Institute of Standards and Technology, Total 7 pp.

* cited by examiner

DYNAMIC THROTTLING THRESHOLDS

FIELD

Embodiments of the invention relate to providing dynamic throttling thresholds. In particular, embodiments of the invention relate to dynamic throttling thresholds for Application Programming Interfaces (APIs) and other requests.

BACKGROUND

In a cloud environment, many resources (e.g., servers, data repositories, etc.) are coupled together. A cloud service may be described as providing functionality via an application executing in the cloud environment (e.g., on a server in the cloud environment).

In such a cloud environment, cloud service providers rely on economies of scale, such as shared servers, shared services, many customers, and many users to drive profits. Customers typically expect the providers deliver a high quality of service and minimize downtime and the loss of functionality. In many cases, downtime is related to resource contention, Denial of Service (DoS) attacks, poor performing application code, and server crashes.

Cloud service providers may monitor and throttle requests, using API management techniques, so that the cloud service provider controls the flow of requests to the cloud service being provided. Throttling requests may include slowing down requests, redirecting requests or stopping requests. For example, a cloud service provider may monitor a number of requests within a time interval, which is used to throttle requests to maintain resource availability, avoid crashes, and maintain a consistent service level. The monitored number of requests is compared against a set limit of requests per the service (global), client application, user details (Internet Protocol (IP) address, security principal) and/or organization.

The most common form of throttling involves the cloud service provider monitoring the IP address of a client application or user's Hypertext Transfer Protocol (HTTP) requests. If the request from one IP exceeds a threshold, a subsequent request from the same IP address is throttled. The threshold may be in terms of a number of requests allowed per unit time (e.g., 30 requests per sec).

Another technique for throttling requires a separate infrastructure to query servers for their health and throttle based on that. However, such queries burden the servers by requiring them to calculate available resources with each such query. If the frequency of such queries is low, route management may be ineffective for real time scenarios. If the frequency of such requests is high, that would potentially bring down an under pressure server.

With the changing landscape of computing and infrastructure, cloud service providers are forced to constantly change and update the threshold to match the changing capabilities of the provided APIs. The changes make it difficult to set a threshold limit up front, since the cloud service provider's capabilities/parameters (e.g., computing power, efficiency, workloads and total number of customers) change.

SUMMARY

In accordance with embodiments, a computer-implemented method is provided for providing dynamic throttling thresholds. The computer-implemented method comprises: receiving a request from a client; incrementing a request count; selecting a current dynamic throttling threshold from a plurality of dynamic throttling thresholds based on the request; in response to determining that the request count is less than the current dynamic throttling threshold, sending the request to a server selected from a plurality of servers for processing, receiving a response and a response time from the server, in response to determining one of 1) that the request count equals or exceeds a recalculation count and 2) that a time interval for recalculation has ended, calculating a new dynamic throttling threshold using the response time, and setting the current dynamic throttling threshold to the new dynamic throttling threshold; and returning the response to the client; and, in response to determining that the request count is not less than the current dynamic throttling threshold, throttling the request.

In accordance with other embodiments, a computer program product is provided for providing dynamic throttling thresholds. The computer program product comprising a computer readable storage medium having program code embodied therewith, the program code executable by at least one processor to perform operations comprising: receiving a request from a client; incrementing a request count; selecting a current dynamic throttling threshold from a plurality of dynamic throttling thresholds based on the request; in response to determining that the request count is less than the current dynamic throttling threshold, sending the request to a server selected from a plurality of servers for processing, receiving a response and a response time from the server, in response to determining one of 1) that the request count equals or exceeds a recalculation count and 2) that a time interval for recalculation has ended, calculating a new dynamic throttling threshold using the response time, and setting the current dynamic throttling threshold to the new dynamic throttling threshold; and returning the response to the client; and, in response to determining that the request count is not less than the current dynamic throttling threshold, throttling the request.

In yet other embodiments, a computer system is provided for providing dynamic throttling thresholds. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a request from a client; incrementing a request count; selecting a current dynamic throttling threshold from a plurality of dynamic throttling thresholds based on the request; in response to determining that the request count is less than the current dynamic throttling threshold, sending the request to a server selected from a plurality of servers for processing, receiving a response and a response time from the server, in response to determining one of 1) that the request count equals or exceeds a recalculation count and 2) that a time interval for recalculation has ended, calculating a new dynamic throttling threshold using the response time, and setting the current dynamic throttling threshold to the new dynamic throttling threshold; and returning the response to the client; and, in response to determining that the request count is not less than the current dynamic throttling threshold, throttling the request.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
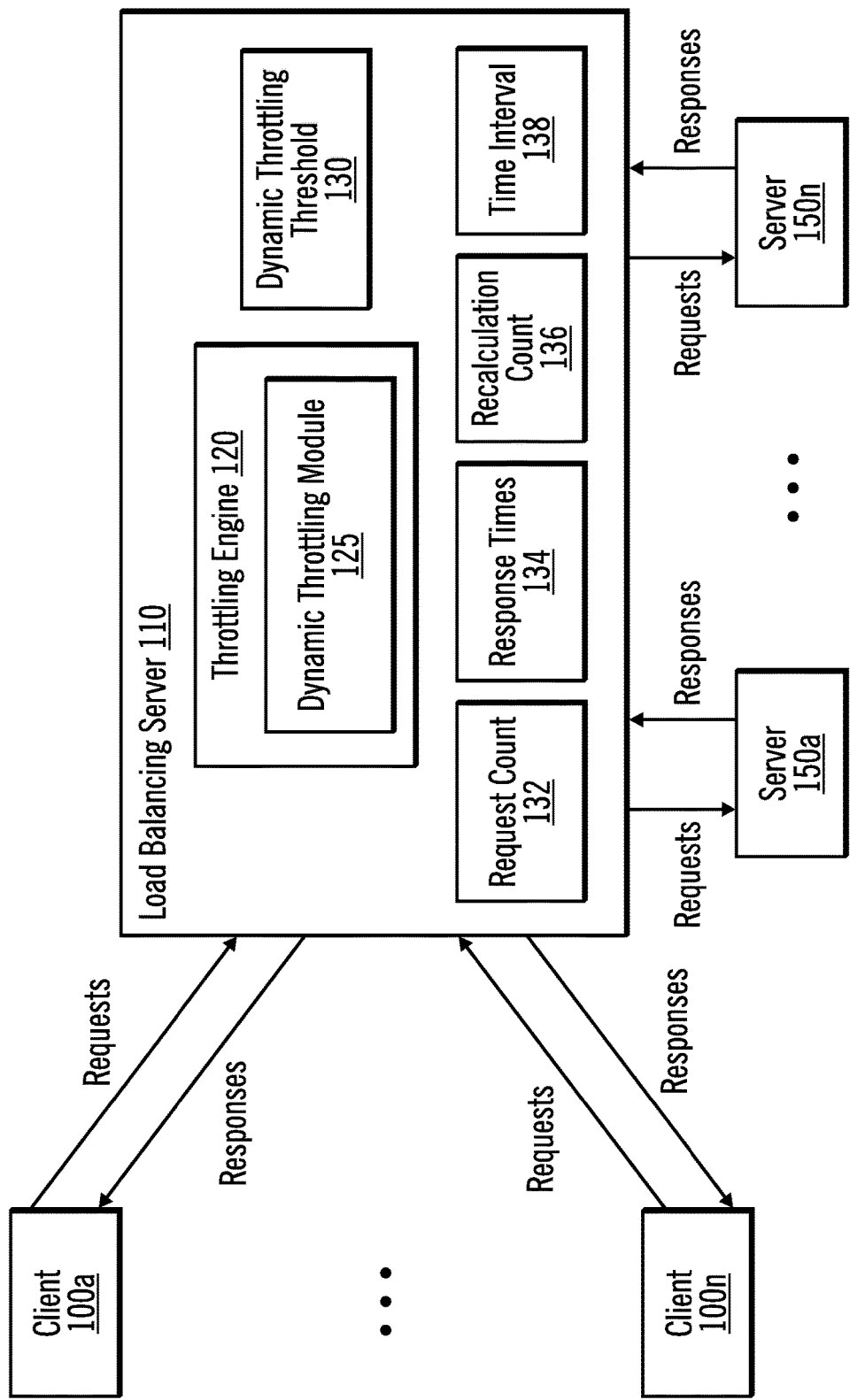
FIG. 1 illustrates, in a block diagram, a computing environment in accordance with certain embodiments.

FIG. 1 illustrates, in a block diagram, a computing environment in accordance with certain embodiments. Clients 100a . . . 100n (i.e., client computers) are coupled to a load balancing server 110. The clients 100a . . . 100n send requests to the load balancing server 110 and receive responses back from the load balancing server 100. The requests may be web-based or internet requests, such as API requests and HTTP requests.

The load balancing server 100 is coupled to servers 150a . . . 150n (i.e., server computers that are cloud service providers). The servers 150a . . . 150n may also be application nodes or server nodes. For each request, the load balancing server 110 identifies a server from among servers 150a . . . 150n (i.e., server computers that are cloud service providers) to process that request and sends the request to that server for processing. The load balancing server 110 may identify the server to balance the loads of the servers 150a . . . 150n (e.g., so that each of the servers 150a . . . 150n processes a similar number of requests). That server processes the request and returns a response and a response time 134. With embodiments, the response time 134 represents how much time it takes for the request to be sent form the load balancing server 110 plus how much time it takes for the response to be generated by a sever 150a . . . 150n and returned to the load balancing server 110. The load balancing server 110 returns the response to the client 150a . . . 150n that issued the request and stores the response time 134 for that request.

The load balancing server 110 includes a throttling engine 120. The load balancing server 110 stores one or more dynamic throttling thresholds 130, a request count 132, response times 134, a recalculation count 136, and a time interval 138. The request count 132 is a number of requests actually received in a particular time interval. The recalculation count 136 is a number of requests that may be processed before triggering recalculation of the dynamic throttling thresholds 130. The time interval 138 is a time period in which requests are to be processed before triggering recalculation of the dynamic throttling thresholds 130.

The throttling engine 120 includes a dynamic throttling module 125, which dynamically (in real-time) adjusts the dynamic throttling thresholds 130 based on the response times 134 when the number of received requests ("request count") equals or exceeds a number of recalculation count or when a time interval ends. In certain embodiments, if a certain number of requests have been processed within a time interval, then recalculation of the dynamic throttling thresholds is triggered.

As requests are received by the load balancing server 110, the throttling engine 120 determines whether to throttle any of the requests based on the dynamic throttling thresholds 130. Throttling requests may include slowing down requests (e.g., by introducing a delay, such as by storing the requests in a queue for delayed processing), redirecting requests (e.g., from one server to another server) or stopping requests (e.g., by returning an indication that the request cannot be processed or by issuing an error message to the client).

The dynamic throttling module 125 dynamically adjusts the dynamic throttling thresholds 130 used to determine whether to throttle requests. With embodiments, there are different dynamic throttling thresholds 130 for different types of requests ("request types"). With embodiments, the requests are classified in various categories based on the level of computational load caused by the requests. With embodiments, the request types include: light read (read a single server object), heavy read (obtain a collection of server objects), create and update (to create or update a server object), and delete (to delete a server object). A subset of these request types and/or other request types may be used in other embodiments. With embodiments, there are different dynamic throttling thresholds 130 for different sources of the request ("request source"). With embodiments the request sources include: an application, a client computer or IP address. A subset of these request sources and/or other request sources may be used in other embodiments.

With embodiments, the dynamic throttling module 125 adjusts the dynamic throttling thresholds 130 by observing the response times 134 from servers 150a . . . 150n on each request, determining the service health based on the response time 134, and adjusting the dynamic throttling thresholds 130 based on the service health. The dynamic throttling module 125 compares recent response times 134 (based on a shifting time window) for the requests to the servers 150a . . . 150n against a desired Service Level Objective (SLO) response time and the adjusts the dynamic throttling thresholds 130.

With embodiments, the dynamic throttling thresholds 130 are for HTTP requests or API requests and are interval based. With embodiments, the dynamic throttling threshold 130 recalculation may be at a different time than the enforcement window (e.g., calculated each day) or based on the number of successful or unsuccessful requests.

With embodiments, the requests that fall outside of the SLO may be redirected to different servers 150a . . . 150n. Embodiments avoid using server-to-server requests or different SLO leveled requests in the calculation of the dynamic throttling thresholds 130 (e.g., synchronization between servers may be ignored).

Figure 2A:
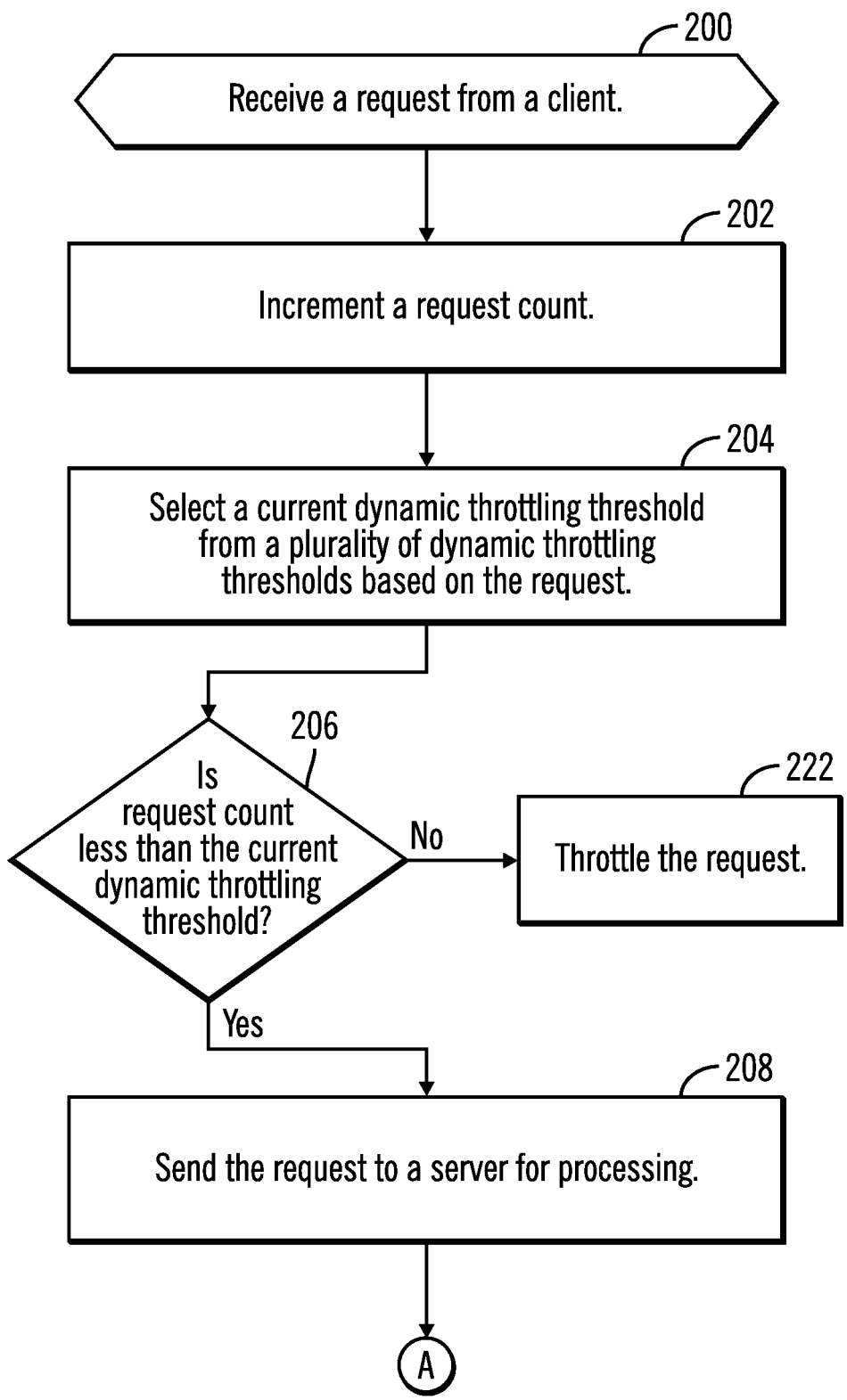
FIGS. 2A and 2B illustrate, in a flow chart, operations for processing a request in accordance with certain embodiments.
Figure 2B:
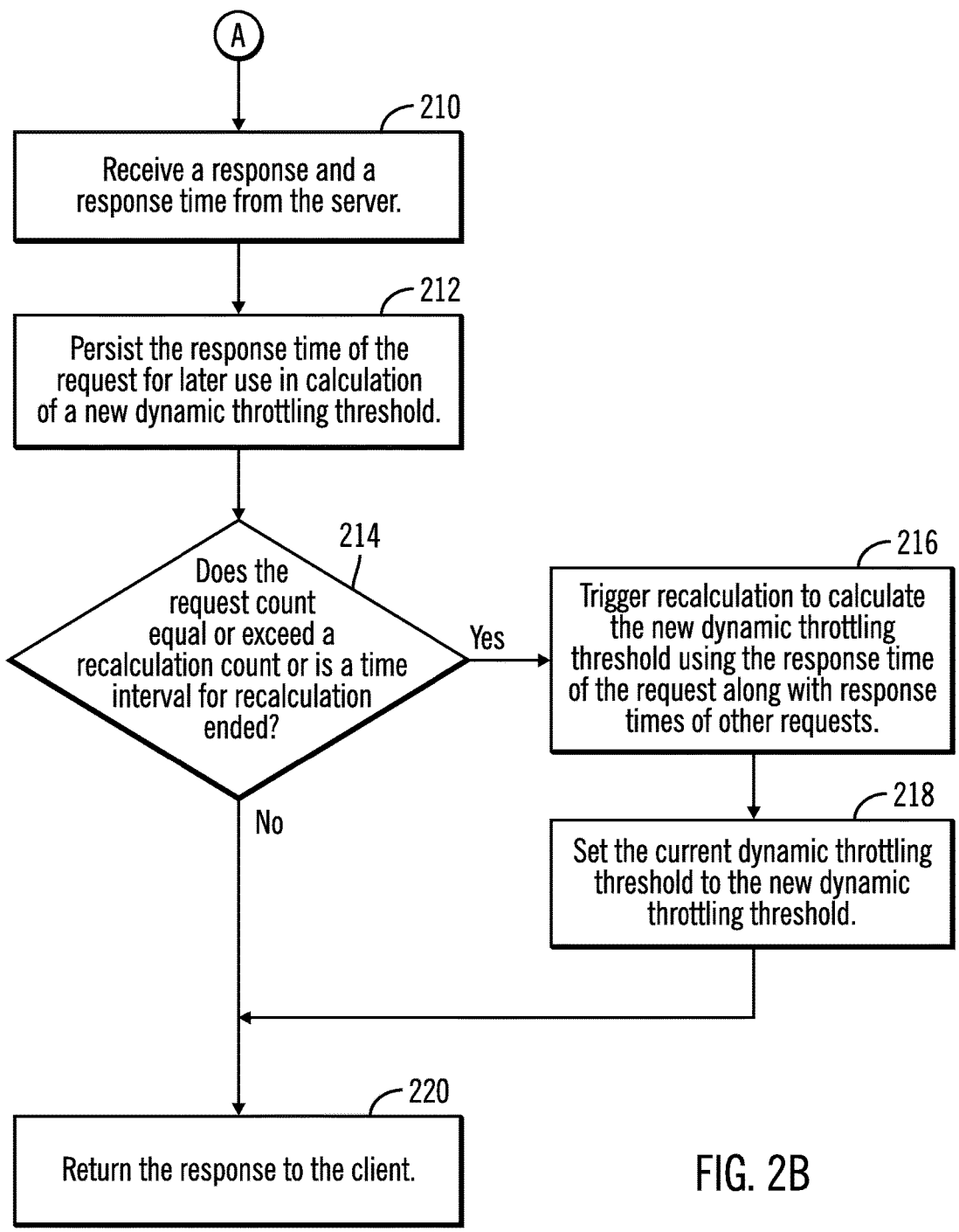

FIGS. 2A and 2B illustrate, in a flow chart, operations for processing a request in accordance with certain embodiments. Control begins at block 200 with the load balancing server 110 receiving a request from a client 100a . . . 100n. In certain embodiments, the request is for a cloud service. In block 202, the dynamic throttling module 125 increments a request count. The request count represents a number of requests received so far in a time interval.

In block 204, the dynamic throttling module 125 selects a current dynamic throttling threshold from a plurality of dynamic throttling thresholds based on the request. In certain embodiments, the dynamic throttling module 125 determines the request type of the request (e.g., determines whether the request is a light read request type, a heavy read request type, a create and update request type or a delete request type) and selects a dynamic throttling threshold based on the request type. Each of the requests types may have a different dynamic throttling threshold 130. Thus, for example, after a request count number of requests, embodiments may be able to process multiple light read requests, but not even one heavy read request. In other embodiments, the dynamic throttling module 125 determines the source of the request (e.g., an application identifier, a client computer identifier, an IP address, an API token, a user identifier (userid), etc.) and selects the dynamic throttling threshold based on the source of the request. Each of the request sources may have a different dynamic throttling threshold 130. In other embodiments, the dynamic throttling module 125 selects the dynamic throttling threshold based on both the request type and the request source, and, in such embodiments, there are a plurality of dynamic throttling thresholds that are associated with combinations of the request type and the request source (e.g., there is a dynamic throttling threshold specific to a light read request type and an IP address).

In block 206, the dynamic throttling module 125 determines whether the request is less than the current dynamic throttling threshold for the request type. If yes, processing continues to block 208, otherwise, processing continues to block 222.

In block 208, the load balancing server 110 sends the request to a server 150a . . . 150n. With embodiments, the load balancing server 110 determines which server 150a . . . 150n is to process the request based on various factors, such as load balancing and which cloud services each server 150a . . . 150n provides compared to what cloud service would process the request. From block 208 (FIG. 2A), processing continues to block 210 (FIG. 2B).

In block 210, the load balancing server 110 receives a response and a response time from the server 150a . . . 150n. In block 212, the load balancing server 110 persists the response time of the request for later use in calculation of a new dynamic throttling threshold.

In block 214, the dynamic throttling module 125 determines whether the request count equals or exceeds a recalculation count or whether a time interval for recalculation has ended. If yes, processing continues to block 216, otherwise, processing continues to block 220.

In block 216, the dynamic throttling module 125 triggers recalculation to calculate the new dynamic throttling threshold using the response time of the request along with the response times of other requests. In block 218, the dynamic throttling module 125 sets the current dynamic throttling threshold to the new dynamic throttling threshold, and processing continues to block 220. In block 220, the load balancing server 110 returns the response to the client.

In block 222, the throttling engine 120 throttles the request.

Thus, with embodiments, on receiving a request to a cloud service provider, if the request count is less than the current dynamic throttling threshold for the request, the request is allowed to pass to a server 150a . . . 150n, otherwise, the request is throttled. On receiving the response, the recalculation of a new dynamic throttling threshold is triggered based on a sliding window that is based on a recalculation count and/or a time interval.

With embodiments, the SLO response time is pre-set for each of the request types and may represent a different, desired response time for that request type. That is, the different request types have different SLO response times. For example, there is an SLO(LR) response time for light read requests, an SLO(HR) response time for heavy read requests, an SLO(CU) response time for create and update requests, and an SLO(D) response time for delete requests. With embodiments, there is a maximum number of requests, for each of the request types, whose response times will be analyzed. Also, there is a time interval (e.g., in minus) that may trigger recalculation of the dynamic throttling threshold. In addition, there is a maximum number of requests after which recalculation of the dynamic throttling threshold if triggered.

Figure 3A:
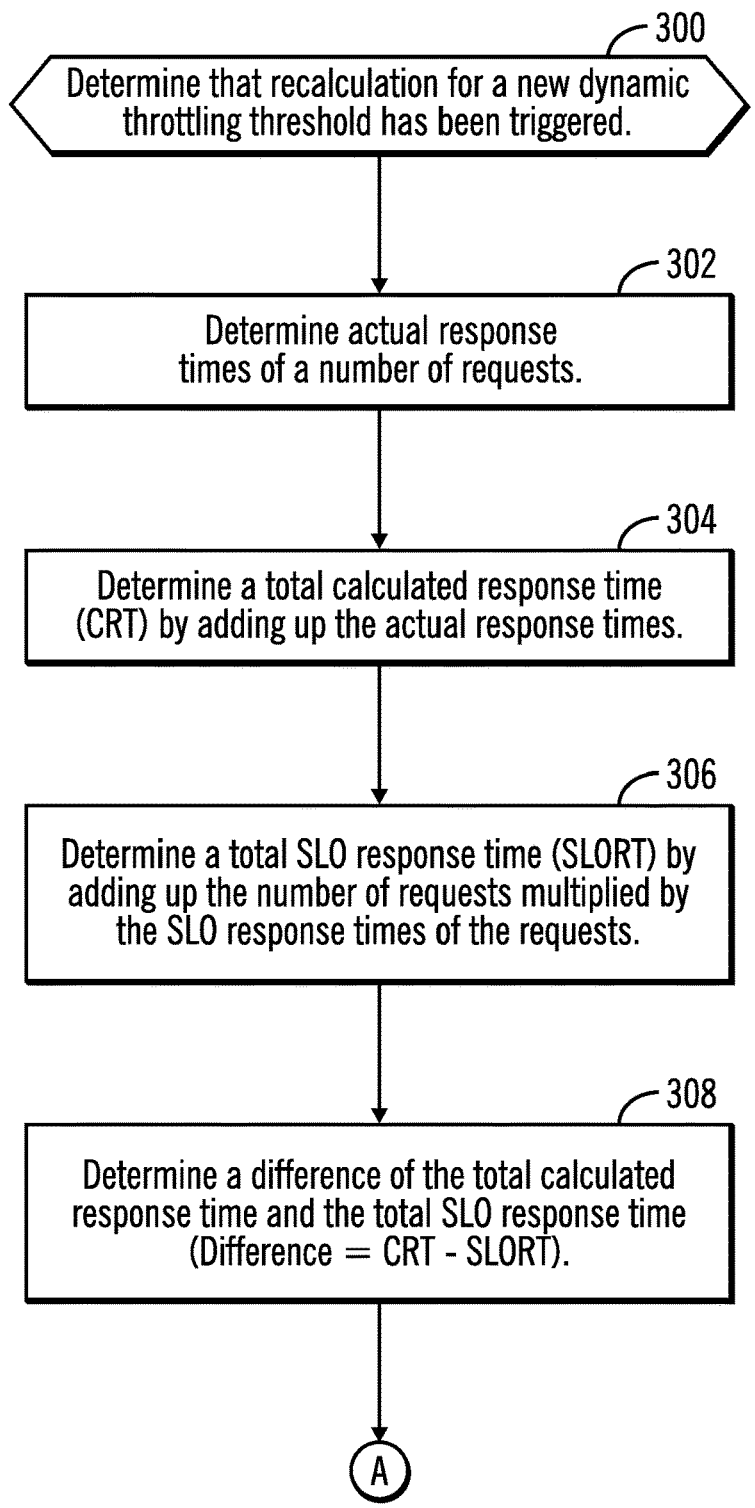
FIGS. 3A and 3B illustrate, in a flow chart, operations for determining a dynamic throttling threshold in accordance with certain embodiments.
Figure 3B:
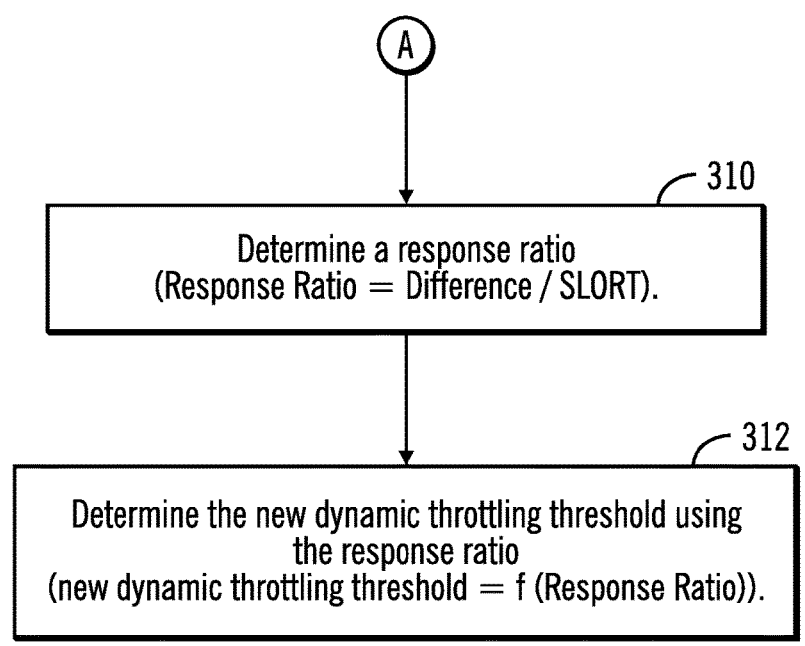

FIGS. 3A and 3B illustrate, in a flow chart, operations for determining a dynamic throttling threshold in accordance with certain embodiments. The dynamic throttling threshold 130 is determined for a request type, a request source or a combination of the request type and the request source. Embodiments determine a total calculated response time (CRT) by adding up the actual response times of the number of requests and determine the total SLO response time (SLORT) for the number of requests. The operations of FIGS. 3A and 3B may be performed multiple times to identify different dynamic throttling thresholds for the request types, the request sources, and the combinations of the request types and the request sources.

Control begins at block 300 with the dynamic throttling module 125 determining that recalculation for a new dynamic throttling threshold has been triggered(based on operations of blocks 214-216 of FIG. 2).

In block 302, the dynamic throttling module 125 determines actual response times of a number of requests. With embodiments, the number of request are for each of the request types, for each of the request sources or for combinations of the request types and request sources. With embodiments, the actual response times are obtained from persistent storage by the dynamic throttling module 125. With embodiments, the number of requests may be limited to a maximum m (e.g., if there are 1000 requests, and the maximum is 500, then the number of requests used in block 302 is 500). The maximum m may be set by a system administrator or other user. If the number of requests is less than m in the time interval, then, the number of requests may be the actual number of requests (e.g., if there are 1000 requests, and the maximum is 2000, then the number of requests used in block 302 is 1000). Thus, if the number of requests is 500 for each request type, and there are four request types, then the actual response times for 2000 requests are obtained.

In block 304, the dynamic throttling module 125 determines a total calculated response time (CRT) by adding up the actual response times.

In block 306, the dynamic throttling module 125 determines a total SLO response time (SLORT) by adding up the number of requests multiplied by the SLO response times of the requests. For example, a client made 10 requests in a minute, as follows:
1. Light Read=5
2. Heavy Read=3
3. Delete=2

The dynamic throttling module 125 obtains the expected time for each type of request per the SLO. For this example, the following are the expected times in milliseconds (ms):
1. Light Read=10 ms
2. Heavy Read=20 ms
3. Delete=15 ms Then, the dynamic throttling module 125 calculates SLORT as follows:

SLORT=(5*10)+(3*20)+(2*15)=140 ms

The SLORT indicates that, in normal load conditions, the 10 requests were expected to be completed under 140 ms.

With embodiments, the SLORT is the expected time for processing requests. With embodiments, cloud service providers have expected turnaround times for requests, and this information used for configuring the initial SLORT timings. In other embodiments, this information may also be calculated dynamically by the dynamic throttling module 125 observing response times for various requests. With embodiments, to ensure SLORT calculations are done in a stable environment, an administrator may be asked to explicitly mark the system to be stable for a certain amount of time and so that requests may be executed and their execution times determined.

In block 308, the dynamic throttling module 125 determines a difference of the total calculated response time and the total SLO response time (Difference=CRT−SLORT). From block 308 (FIG. 3A), processing continues to block 310 (FIG. 3B).

In block 310, the dynamic throttling module 125 determines a response ratio (Response Ratio=Difference/SLORT). In block 312, the dynamic throttling module 125 determines the new dynamic throttling threshold using the response ratio (new dynamic throttling threshold=f (Response Ratio). The dynamic throttling threshold 130 may be for a request type, a request source or a combination of the request type and the request source, as identified in block 300.

With embodiments, if the response ratio is less than zero, then the dynamic throttling threshold is a maximum threshold (i.e., if response ratio <0, dynamic throttling threshold=maximum threshold). With embodiments, if the response ratio is greater than one, then the dynamic throttling threshold is a minimum threshold (i.e., if response ratio >1, dynamic throttling threshold=minimum threshold). With embodiments, if the response ratio is between zero and one, then the dynamic throttling threshold is a an adjusted minimum threshold (i.e., if 0<response ratio <1, dynamic throttling threshold=minimum threshold+(1−response ratio)*maximum threshold). With embodiments, if the response ratio is equal to zero or one, the dynamic throttling threshold may be the adjusted minimum threshold or another threshold. The minimum threshold and the maximum threshold may be set by a system administrator (e.g., based on a number of requests that the server 150a . . . 150n is to process in a unit of time, based on historic analysis of server performance or based on both of these factors). With this, the dynamic throttling threshold linearly varies with the response ratio. Exponential functions may be used to determine the dynamic throttling threshold based on the response ratio in alternative embodiments.

With embodiments, there is a different dynamic throttling threshold (i.e., a maximum number of requests) that may be processed for each request source depending on the server health. With embodiments, an application key (appkey) refers to attributes associated with different forms of authentication. In some cases, such as basic authentication, the end user may be identified without using the appkey. However, in other authentication scenarios, the end user is identified is identified using the appkey.

Thus, the dynamic throttling module 125 tracks the actual response times for these requests and computes a deviation. This deviation is used to compute a new dynamic throttling threshold 130. The dynamic throttling threshold 130 is calculated after analyzing the requests within a sliding window. The sliding window is implemented in two forms: 1) a time based window where only requests and their response times in a fixed time interval are analyzed (e.g., any number of requests in a 5 minute window) and 2) a request magnitude based window where a fixed number of requests are analyzed (e.g., the request count equals or exceeds 1500 requests). In these cases, recalculation of a new dynamic throttling threshold is triggered.

By providing more efficient dynamic throttling thresholds 130, the load balancing server 110 is able to more efficiently process the requests. This leads to improved processing times for the computing environment of FIG. 1.

Thus, embodiments protect the environment during scale out (at the edge-proxy, gateway). Embodiments learn parameter cost to predict future parameter patterns and anti-patterns (i.e., embodiments learn cost associated with every request and categorize each request as a particular request source). With embodiments, calculation of dynamic throttling thresholds 130 are based on server response time, rather than a continuous set of queries to the servers. Embodiments use existing servers that are cloud service providers without modifying the existing application tier. Embodiments analyze the response times of previous requests within a shifting time window. Also, embodiments recalculate the dynamic throttling thresholds 130, and such recalculation may be triggered by a combination of a number of calls and a time interval or either of these occurring first. Embodiments provide enhanced business continuity (i.e., factors triggering recalculation of threshold may be one (either because a certain time window has elapsed (e.g., 60 seconds) or a certain number of requests have been made), and this acts as safety net in case an end user makes a threatening number of request calls within the recalculation window. Embodiments work with state-full or stateless applications.

With embodiments, operations include: receiving a request from a client; in response to determining that the request is less than a dynamic threshold limit, passing the request to an application node; in response to receiving a response from the application node, storing a response time for the request; in response to determining that a request count is less than a recalculation count or that a time limit has not expired, recalculating the dynamic throttling threshold based on the response time; and returning the response to the client. Moreover, in response to determining that the request is not less than the current dynamic threshold limit, operations throttle the request.

Embodiments dynamically find and adjust service capability of an entire cloud ecosystem that is typically composed of various virtual servers, application servers, back-end services, security services etc. Thus, embodiments throttle requests using dynamically adjusted throttling thresholds based on the current health of the cloud ecosystem.

Embodiments operate at a gateway layer and proactively notice a drop in server health and adjust the dynamic throttling thresholds at the gateway layer itself. This saves computation time, server resources, and also triggers protective measures before cloud services are impacted. With embodiments, the gateway layer refers to the fact that the dynamic throttling module 125 is not part of application issuing the requests, but, instead operates as an independent layer. Then, the requests pass through the dynamic throttling module 125 before they are forwarded to the appropriate application layer.

Embodiments provide for a uniform bandwidth utilization across all requests, adjusting the dynamic throttling thresholds dynamically for all requests for servers in the cloud ecosystem.

Embodiments provide an inline proxy (i.e., the dynamic throttling module 125) that scores an application's response time independent of code changes to that application (and the application is the one for which the request was issued).

Figure 4:
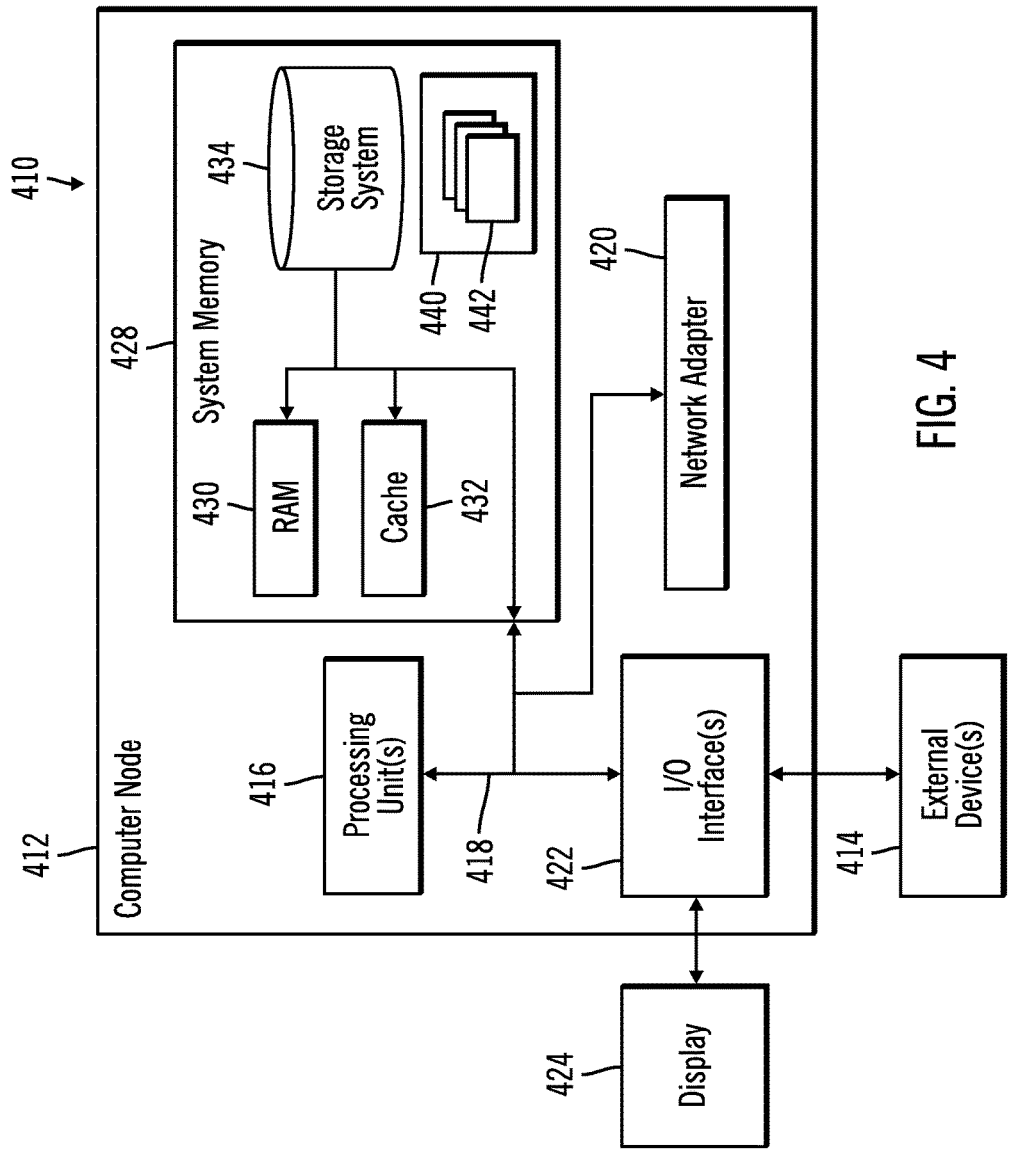
FIG. 4 illustrates a computing node in accordance with certain embodiments.

FIG. 4 illustrates a computing environment 410 in accordance with certain embodiments. In certain embodiments, the computing environment is a cloud computing environment. Referring to FIG. 4, computer node 412 is only one example of a suitable computing node and is not intended to suggest any limitation as to the scope of use or functionality of embodiments of the invention described herein. Regardless, computer node 412 is capable of being implemented and/or performing any of the functionality set forth hereinabove.

The computer node 412 may be a computer system, which is operational with numerous other general purpose or special purpose computing system environments or configurations. Examples of well-known computing systems, environments, and/or configurations that may be suitable for use with computer node 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 412 may be described in the general context of computer system executable instructions, such as program modules, being executed by a computer system. Generally, program modules may include routines, programs, objects, components, logic, data structures, and so on that perform particular tasks or implement particular abstract data types. Computer node 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer node 412 is shown in the form of a general-purpose computing device. The components of computer node 412 may include, but are not limited to, one or more processors or processing units 416, a system memory 428, and a bus 418 that couples various system components including system memory 428 to one or more processors or processing units 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 412 typically includes a variety of computer system readable media. Such media may be any available media that is accessible by computer node 412, and it includes both volatile and non-volatile media, removable and non-removable media.

System memory 428 can include computer system readable media in the form of volatile memory, such as random access memory (RAM) 430 and/or cache memory 432. Computer node 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 428 may include at least one program product having a set (e.g., at least one) of program modules that are configured to carry out the functions of embodiments of the invention.

Program/utility 440, having a set (at least one) of program modules 442, may be stored in system memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer node 412 may also communicate with one or more external devices 414 such as a keyboard, a pointing device, a display 424, etc.; one or more devices that enable a user to interact with computer node 412; and/or any devices (e.g., network card, modem, etc.) that enable computer node 412 to communicate with one or more other computing devices. Such communication can occur via Input/Output (I/O) interfaces 422. Still yet, computer node 412 can communicate with one or more networks such as a local area network (LAN), a general wide area network (WAN), and/or a public network (e.g., the Internet) via network adapter 420. As depicted, network adapter 420 communicates with the other components of computer node 412 via bus 418. It should be understood that although not shown, other hardware and/or software components could be used in conjunction with computer node 412. Examples, include, but are not limited to: microcode, device drivers, redundant processing units, external disk drive arrays, RAID systems, tape drives, and data archival storage systems, etc.

In certain embodiments, the clients 100a . . . 100n, the load balancing server 110, and the servers 150a . . . 150n each has the architecture of computer node 412. In certain embodiments, the clients 100a . . . 100n, the load balancing server 110, and the servers 150a . . . 150n are part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
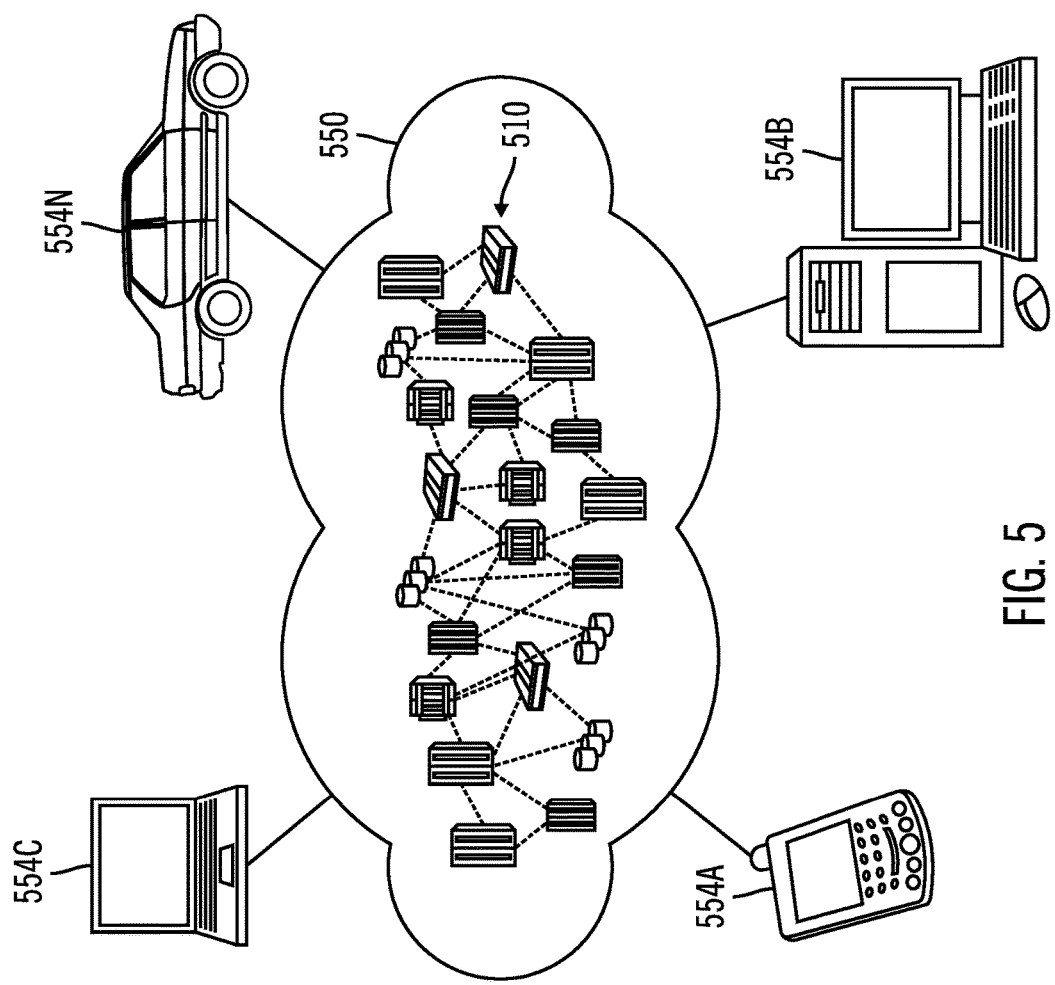
FIG. 5 illustrates a cloud computing environment in accordance with certain embodiments.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
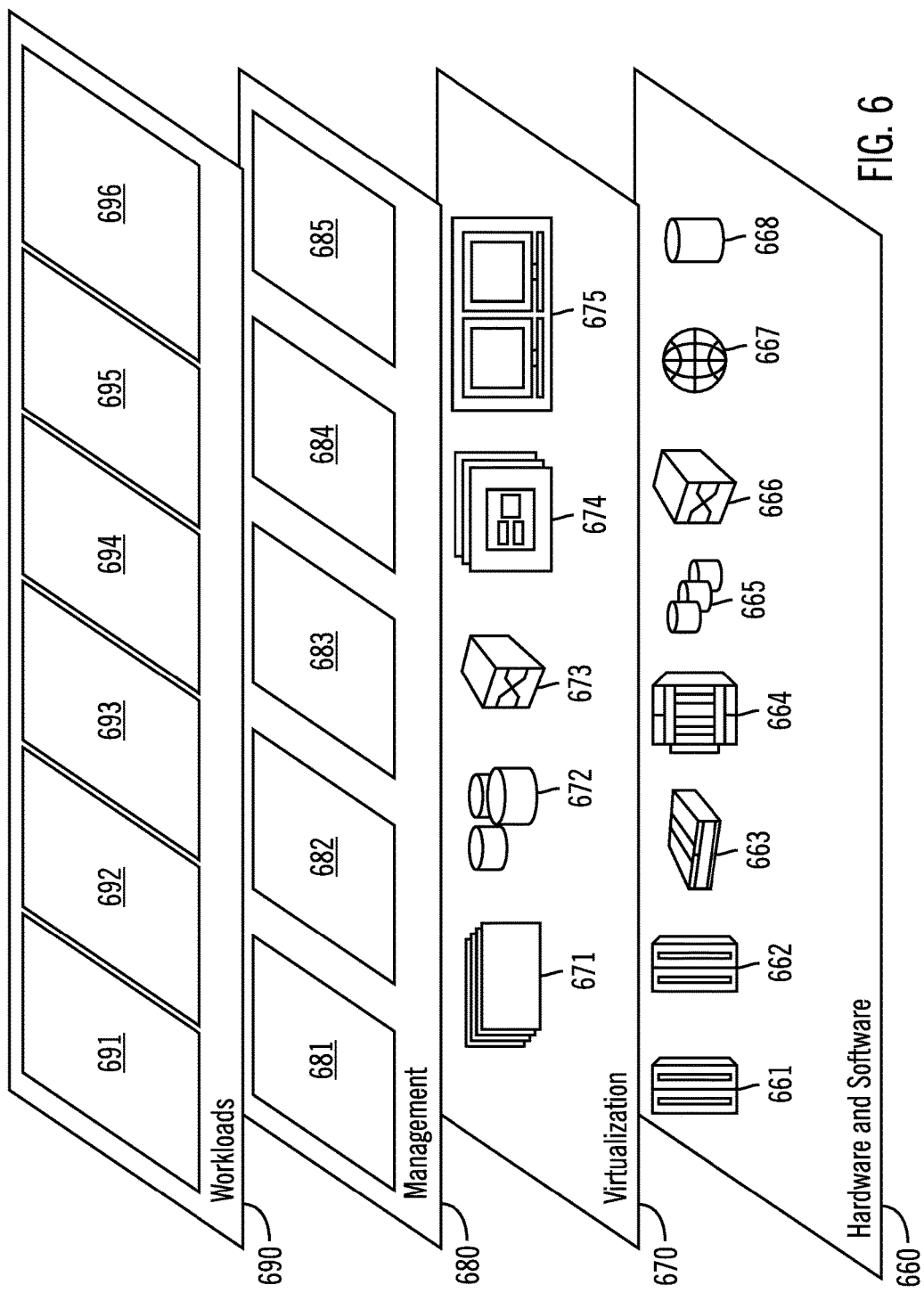
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and providing dynamic throttling thresholds 696.

Thus, in certain embodiments, software or a program, implementing dynamic throttling thresholds in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving, with a processor of a computer, a request from a client;
incrementing a request count;
selecting a current dynamic throttling threshold from a plurality of dynamic throttling thresholds based on the request;
determining whether the request count is less than the current dynamic throttling threshold;
in response to determining that the request count is less than the current dynamic throttling threshold,
sending the request to a server selected from a plurality of servers for processing;
receiving a response and a response time from the server;
determining one of 1) that the request count equals or exceeds a recalculation count and 2) that a time interval for recalculation has ended;
calculating a new dynamic throttling threshold using the response time of the request, response times of additional requests, and expected times for processing a number of requests;
setting the current dynamic throttling threshold to the new dynamic throttling threshold; and
returning the response to the client; and
in response to determining that the request count is not less than the current dynamic throttling threshold, throttling the request.

2. The method of claim 1, wherein throttling the request comprises any of slowing down the request by storing the request in a queue for later processing, redirecting the request to another server selected from the plurality of servers, and stopping the request by issuing an error message to the client.

3. The method of claim 1, wherein calculating the new dynamic throttling threshold further comprises:
determining a total calculated response time by adding up the response time and the response times of the additional requests;
determining a total service level objective response time by adding up the number of requests multiplied by service level response times of the requests;
determining a difference of the total calculated response time and the total service level objective response time;
determining a response ratio of the difference and the total service level objective response time; and
recalculating the new dynamic throttling threshold using the response ratio.

4. The method of claim 3, wherein the number of requests are for any of a request type, a request source, and a combination of the request type and the request source.

5. The method of claim 3, further comprising:
in response to the response ratio being less than zero, setting the new dynamic throttling threshold to a maximum threshold;
in response to the response ratio being greater than one, setting the new dynamic throttling threshold to a minimum threshold; and
in response to the response ratio being between zero and one, setting the new dynamic throttling threshold to an adjusted minimum threshold.

6. The method of claim 1, wherein a Software as a Service (SaaS) is configured to perform method operations.

7. A computer program product, the computer program product comprising a computer readable storage medium having program code embodied therewith, the program code executable by at least one processor to perform operations comprising:
receiving a request from a client;
incrementing a request count;
selecting a current dynamic throttling threshold from a plurality of dynamic throttling thresholds based on the request;
determining whether the request count is less than the current dynamic throttling threshold;
in response to determining that the request count is less than the current dynamic throttling threshold,
sending the request to a server selected from a plurality of servers for processing;
receiving a response and a response time from the server;
determining one of 1) that the request count equals or exceeds a recalculation count and 2) that a time interval for recalculation has ended;
calculating a new dynamic throttling threshold using the response time of the request, response times of additional requests, and expected times for processing a number of requests;
setting the current dynamic throttling threshold to the new dynamic throttling threshold; and
returning the response to the client; and
in response to determining that the request count is not less than the current dynamic throttling threshold, throttling the request.

8. The computer program product of claim 7, wherein throttling the request comprises any of slowing down the request by storing the request in a queue for later processing, redirecting the request to another server selected from the plurality of servers, and stopping the request by issuing an error message to the client.

9. The computer program product of claim 7, wherein the program code is executable by at least one processor to perform operations comprising:
  determining a total calculated response time by adding up the response time and the response times of the additional requests;
  determining a total service level objective response time by adding up the number of requests multiplied by service level response times of the requests;
  determining a difference of the total calculated response time and the total service level objective response time;
  determining a response ratio of the difference and the total service level objective response time; and
  recalculating the new dynamic throttling threshold using the response ratio.

10. The computer program product of claim 9, wherein the number of requests are for any of a request type, a request source, and a combination of the request type and the request source.

11. The computer program product of claim 9, wherein the program code is executable by at least one processor to perform operations comprising:
  in response to the response ratio being less than zero, setting the new dynamic throttling threshold to a maximum threshold;
  in response to the response ratio being greater than one, setting the new dynamic throttling threshold to a minimum threshold; and
  in response to the response ratio being between zero and one, setting the new dynamic throttling threshold to an adjusted minimum threshold.

12. The computer program product of claim 7, wherein a Software as a Service (SaaS) is configured to perform computer program product operations.

13. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more memories, to perform operations comprising:
  receiving a request from a client;
  incrementing a request count;
  selecting a current dynamic throttling threshold from a plurality of dynamic throttling thresholds based on the request;
  determining whether the request count is less than the current dynamic throttling threshold;
  in response to determining that the request count is less than the current dynamic throttling threshold,
    sending the request to a server selected from a plurality of servers for processing;
    receiving a response and a response time from the server;
    determining one of 1) that the request count equals or exceeds a recalculation count and 2) that a time interval for recalculation has ended;
    calculating a new dynamic throttling threshold using the response time of the request, response times of additional requests, and expected times for processing a number of requests;
    setting the current dynamic throttling threshold to the new dynamic throttling threshold; and
    returning the response to the client; and
  in response to determining that the request count is not less than the current dynamic throttling threshold, throttling the request.

14. The computer system of claim 13, wherein throttling the request comprises any of slowing down the request by storing the request in a queue for later processing, redirecting the request to another server selected from the plurality of servers, and stopping the request by issuing an error message to the client.

15. The computer system of claim 13, wherein calculating the new dynamic throttling threshold further comprises:
  determining a total calculated response time by adding up the response time and the response times of the additional requests;
  determining a total service level objective response time by adding up the number of requests multiplied by service level response times of the requests;
  determining a difference of the total calculated response time and the total service level objective response time;
  determining a response ratio of the difference and the total service level objective response time; and
  recalculating the new dynamic throttling threshold using the response ratio.

16. The computer system of claim 15, wherein the number of requests are for any of a request type, a request source, and a combination of the request type and the request source.

17. The computer system of claim 15, further comprising:
  in response to the response ratio being less than zero, setting the new dynamic throttling threshold to a maximum threshold;
  in response to the response ratio being greater than one, setting the new dynamic throttling threshold to a minimum threshold; and
  in response to the response ratio being between zero and one, setting the new dynamic throttling threshold to an adjusted minimum threshold.

18. The computer system of claim 13, wherein a Software as a Service (SaaS) is configured to perform computer system operations.

* * * * *